Feb. 22, 1966 D. B. REINKE 3,236,049
HYDROSTATIC TRANSMISSION
Filed Oct. 24, 1963
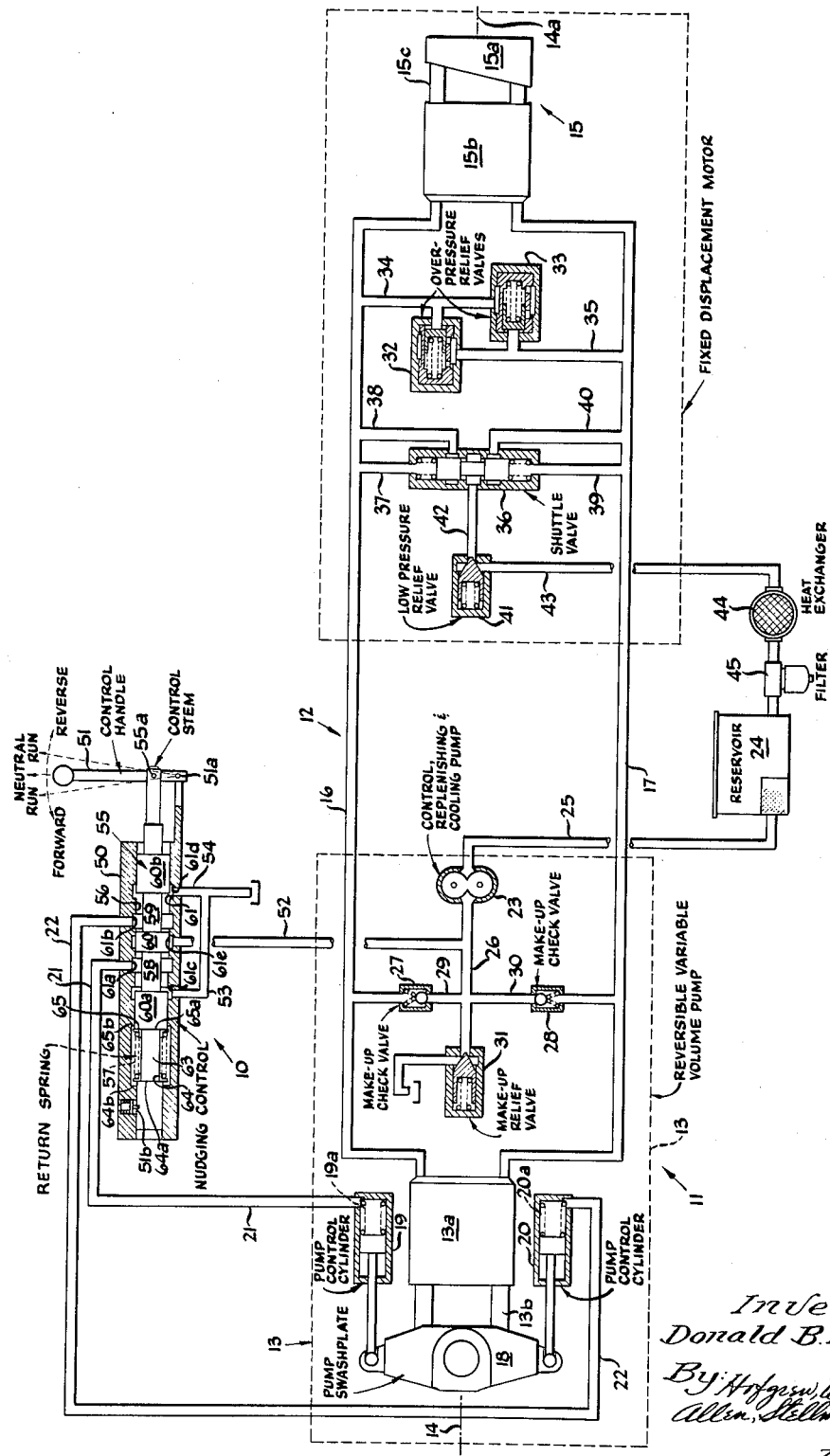
Inventor:
Donald B. Reinke
By Hofgren, Wegner,
Allen, Stellman & McCord
Attorneys

United States Patent Office 3,236,049
Patented Feb. 22, 1966

3,236,049
HYDROSTATIC TRANSMISSION
Donald B. Reinke, Rockford, Ill., assignor to Sundstrand Corporation, a corporation of Illinois
Filed Oct. 24, 1963, Ser. No. 318,663
7 Claims. (Cl. 60—53)

This invention relates to hydrostatic transmissions and more particularly to a control means therefor.

Hydrostatic transmissions are particularly adaptable for use with slow moving, hard working vehicles such as lift trucks, combines and the like. This type of vehicle requires the ability to operate over a wide range of torque and speed differences and to obtain smooth accelerations and decelerations under varying load conditions. It is desirable that such a transmission be capable of holding the selected speed which has been imparted thereto. It is further desirable that such a transmission be capable of rapid variance of the travel speed and quick reversals without changing the speed of the prime mover or main power source.

It is a general object of this invention to provide a new and improved control means for a hydrostatic transmission.

It is a primary object of this invention to provide a new and improved control means for a hydrostatic transmission which possesses the advantages mentioned above.

It is another object of this invention to provide a new and improved control means for a hydrostatic transmission having a pump and motor, means for varying the displacement of the pump, means providing a source of control fluid under pressure, and valve means controlling the flow of fluid to and from the displacement varying means including a manually movable, spring returned valve member operable between a position supplying control fluid under pressure to the displacement means to adjust the latter and a position blocking the flow of fluid relative to the displacement means to lock the latter at a selected displacement position.

Further objects and advantages will become apparent from the following detailed description taken in connection with the accompanying drawings, in which:

The single figure is a diagrammatic illustration of a hydrostatic transmission embodying the control means of the present invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawing, the control means 10 of this invention is shown in use with a hydrostatic transmission 11 consisting of a closed hydraulic circuit 12 having a pump 13 at one end driven by a prime mover shaft represented diagrammatically at 14 and a motor 15 for driving an output shaft 14a which is connected to means for moving the vehicle. The motor and pump are interconnected by the conduits 16 and 17 to establish a closed hydraulic circuit.

The pump and motor are preferably of the axial piston type. The motor is of the fixed displacement type having a stationary cam plate 15a and a rotatable cylinder block 15b with an annular series of axial pistons 15c engaging cam plate 15a. The pump is of the reversible variable volume type including a rotatable cylinder block 13a with pistons 13b and is provided with a volume varying means or movable reversible swash plate 18 engaged by pistons 13b and adapted to be selectively positioned by the piston rods of control cylinders 19 and 20 for supplying the desired directional movement and speed to the motor. The control cylinders 19 and 20 are provided respectively with centering springs 19a and 20a to normally position the swash plate upright as shown in the diagram so that the pump is in neutral or zero displacement. Conduits 21 and 22 establish fluid communication between the control means 10 and the control cylinders 19 and 20 for selectively actuating the control cylinders for appropriate positioning of the swash plate 18.

The transmission is further supplied with a replenishing, control and cooling pump 23 which preferably is a positive displacement pump also driven by the prime mover. The replenishing pump 23 receives fluid from the reservoir 24 by means of a conduit 25 and pumps the same outward through a conduit 26. Spring biased check valves 27 and 28 are in communication with the conduit 26 and with the conduits 16 and 17, respectively, by means of conduits 29 and 30 and permit replenishing fluid to be supplied to the low pressure side of the hydraulic circuit through one check valve while pressure in the high pressure conduit maintains the other check valve closed. A spring biased make-up relief valve 31 communicates with the conduit 26 and discharges excess replenishing fluid to the reservoir when the transmission is in neutral. As illustrated, the pump 23 together with valves 27, 28 and 31 are included in a housing for pump 13 represented by broken line box 13'. The capacity of the pump 23 is sufficient to replace leakage fluid to supply control fluid to valve 10 and to supply cooling fluid to the circuit in excess of that required for make-up and control purposes to displace heated fluid and maintain the transmission cool.

The transmission also includes a shuttle valve which is in communication with the conduits 16 and 17 by means of conduits 37, 38, 39 and 40 and a low pressure or heated fluid relief valve 41 which is in communication with the shuttle valve by means of conduit 42. The purpose of the shuttle valve is to establish a circuit with the line 16 or 17 that is at low pressure and the low pressure relief valve 41 to provide a means for removing heated oil replaced by cooling oil supplied by the replenishing pump. The fluid in the line at high pressure will actuate the valve 36 through conduit 37 or 39 so that communication will be established between the low pressure side and the low pressure relief valve through one of the conduits 38 or 40 and conduit 42. The heated oil returns to the reservoir by means of the conduit 43, passing through a heat exchanger 44 and a filter 45 to cool and clean the fluid before it re-enters the reservoir for re-use. The shuttle valve is normally spring centered in a closed position so that during the transition of reversing the pressure in the main line as the pump is appropriately reversed to change the direction of the vehicle no high pressure oil will be lost from the circuit.

The transmission includes two overpressure relief valves 32 and 33 in communication, respectively, with conduits 16 and 17 by means of conduits 34 and 35. The purpose of the overpressure relief valves is to prevent abnormally high pressure in either of the main hydraulic lines 16 and 17. In response to such pressures the appropriate valve is actuated so that the high pressure lines of the hydraulic conduits 16 or 17 may be relieved of surge pressures by dumping the oil to the low pressure side during such conditions as rapid acceleration or braking. For example, on the occurrence of such high pressure in line 16, pressure in conduit 34 actuates valve 32 to relieve the pressure through conduit 35 to line 17.

The control means 10 of this invention includes a control valve housing 50 and is adapted to be actuated by a manually operable control handle 51 which is pivotally mounted on the housing at 51a. The control handle 51 may be positioned in positions including "neutral," "run forward," "accelerate forward," "run reverse" and "accelerate reverse." Suitable detenting or frictional means may be used to yieldably maintain the handle in neutral as illustrated by spring biased detent means 51b. The control valve receives control fluid from the replenishing pump by means of the control fluid conduit 52 which is in communication with the conduit 26 and returns fluid to the reservoir 24 through the control valve exhaust conduits 53 and 54.

The control valve includes a valve stem or piston 55 which is suitably pivotally secured to the control handle 51 at 55a and laterally movable in the valve chamber 56 in response to movement of the handle. A return spring 57 is provided to maintain the valve in selected "run" position when the control handle is released while in an "accelerate" position. The valve stem is provided with reduced portions 58 and 59 and center land 60 and aids lands 60a and 60b for cooperation with annular grooves 61 of the valve core 56 to effectuate selective control and valving actions.

Valve return spring 57 is fitted on a reduced portion 63 of stem 55 with opposite ends bearing against annular spring seats 64 and 65 slidable on portion 63 and engageable with adjacent annular stop shoulders 64a and 65a on the valve stem and annular abutment shoulders 64b and 65b in the valve housing 50, the latter each axially spaced respectively from the adjacent shoulder on the stem.

As shown in the diagram, when the control valve is in neutral, the pump control cylinders 19 and 20 are open to the reservoir to exhaust fluid, and the centering springs 19a and 20a position the swash plate so that the pump is in a zero displacement position. The conduits 21 and 22 which communicate with the pump control cylinders empty into the valve into the annular grooves 61a and 61b, respectively, and the fluid therein passes by the reduced portions 58 and 59, respectively, to exit from the valve through the annular grooves 61c and 61d, respectively. From the annular grooves 61c and 61d, which communicate with the drain conduits 53 and 54, respectively, the control fluid is returned to the reservoir.

When the handle is moved to the left as shown in the diagram, past the "run" position and to the "accelerate forward" position, the valve stem will similarly be moved to the left so that the land 60 moves to the left relative to annular grooves 61e, permitting control fluid from the conduit 52 to pass by the reduced portion 59 out the conduit 22 where it will be supplied to the pump control cylinder 20. Cylinder 19 communicates with the drain through conduit 21, reduced valve portion 58 and conduit 53. As the fluid enters the pump control cylinder 20 the swash plate will be tilted to increase the displacement of the pump thereby to pump fluid under pressure to the motor 15 for driving the vehicle forwardly. When the operator releases the handle 51, the compressed return spring 57 will cause the handle to return to a run position which will move the valve stem 55 far enough to the right to cause the land 60 to block the annular portion 61e so that no more control fluid may enter from the conduit 52. In such position, spring seat 64 bears against annular shoulder 64b in housing 50 and is displaced off the adjacent annular shoulder 64a on stem 55 and spring seat 65 bears against the adjacent annular shoulder 65a on stem 55 and is displaced from the adjacent shoulder 65b in housing 50. Land 60b will still sufficiently cover the annular groove 61b so that fluid from the cylinder 20 will not be permitted to drain by means of the conduit 22 and the conduit 54. The conduit 21 will still be partially open to drain. Thus as the handle is returned to the run position by the return spring, the pump swash plate will be so positioned to maintain the vehicle at the speed established prior to release of the control handle 51.

Vehicle speed can be increased by moving the control valve against the return spring and thence returning the handle to the "accelerate" position. Vehicle speed can be reduced by moving the valve stem to the neutral position to exhaust both pump control cylinders so that spring 19a reduces the pump displacement until the desired speed is obtained. At that time the control may be returned to the run position or, if the vehicle speed is to be reduced to zero, the control may be retained in the neutral position. To drive the vehicle in a reverse direction the aforementioned steps are taken except that the handle and the valve are, of course, positioned in a reverse direction.

An important feature of the control means of this transmission is the dynamic braking afforded thereby. In reducing pump displacement the vehicle operator requires the pump to absorb flow from the hydraulic motor through the appropriate return conduit, thereby attaining engine braking. As was the case with acceleration, the degree of braking is dependent upon the degree the operator moves the control handle 51. Maximum braking may be obtained in an emergency situation by rapidly moving the control handle to the reverse position.

It will be understood that the control of this invention facilitates speed control in a convenient manner. When it is desirable to accelerate, the operator simply moves the control handle in the direction desired to the "accelerate" position until the desired speed is attained, whereupon he releases the handle and it automatically returns to "run" position where the speed is held. When slight increase in speed is required, it is obtained by simply nudging the handle.

I claim:

1. In a hydrostatic transmission, in combination, a variable displacement axial piston pump having a reversible swash plate, an axial piston motor, conduit means connecting the pump outlet with the motor inlet and connecting the motor outlet with the pump inlet so that the pump supplies fluid under pressure to drive the motor, hydraulic means for varying the displacement of the pump including a servo mechanism for selectively positioning the swash plate to vary the pump displacement and thereby vary the speed of the motor, means biasing the displacement means to a minimum displacement position, means providing a source of control fluid under pressure, and valve means controlling the flow of fluid to and from the displacement varying means including a valve member movable between a valve open position supplying control fluid under pressure from said source to said displacement varying means to adjust the latter, a valve closed position blocking the flow of fluid relative to the displacement varying means to lock the latter, and a neutral position draining fluid under pressure from the displacement varying means to position the pump at minimum displacement.

2. The hydrostatic transmission of claim 1 including resilient means for urging the valve member to said valve closed position.

3. In a hydrostatic transmission, in combination, a fluid motor, a variable displacement fluid pump, conduit means connecting the pump outlet with the motor inlet enabling the pump to supply fluid to the motor for driving the latter, fluid operable means for varying the displacement of the pump, means normally maintaining the displacement varying means in a minimum displacement position, means providing a source of control fluid under pressure, and valve means controlling the flow of fluid to and from the displacement varying means including a valve housing having a supply port communicating with said source, a motor port communicating with said displacement varying means and a drain port, together with a valve member normally positioned in a neutral position blocking said supply port and communicating said motor port with said drain port and movable in one direction successively to a first position to block said supply port and block said motor port thereby locking the pump swash plate in a predetermined displacement condition, and a second position placing the supply port in communication with said motor port, means for yieldably holding the valve member in neutral position, manually operable means connected to the valve for moving the latter between the positions described, and means for moving the valve member from an acceleration position to said first position when released after manual movement to an acceleration position comprising a coiled compression spring on the valve member, spring seats on the valve member receiving opposite ends of the spring, one spring seat being movable on the valve member and urged away from the other by the spring, a stop on the valve member limiting movement of the movable spring seat away from the other, and an abutment in the valve housing spaced from the stop on the valve member when the latter is in neutral position and engageable by the seat on movement of the valve member from the "run" position to an acceleration position.

4. In a hydrostatic transmission for propelling a vehicle, in combination, a reversible fluid motor, a variable displacement fluid pump, conduits connecting the pump outlet with the motor inlet and the motor outlet with the pump inlet so that the pump and motor are connected in closed hydraulic circuit enabling the pump to supply fluid to the motor for driving the latter in opposite directions, reversible fluid operable means for varying the displacement of the pump in opposite directions from zero displacement, means normally maintaining the displacement varying means in zero displacement position, means providing a source of control fluid under pressure, and valve means normally positioned in a neutral center position connecting both sides of the fluid operable means to drain, and movable in opposite directions from the neutral position to "accelerate positions" connecting one side of the fluid operable means to drain and the other side to said source to increase pump displacement in a predetermined direction, and said valve means being movable from the accelerate positions to "run" positions respectively intermediate the accelerate positions and the neutral position wherein flow of fluid to and from at least one side of said fluid operable means is blocked thereby to lock the transmission at a predetermined position.

5. In a hydrostatic transmission for propelling a vehicle of the hard working, slow moving type, in combination, a reversible fluid motor, a variable displacement fluid pump, conduits respectively connecting the pump outlet with the motor inlet and the motor outlet with the pump inlet so that the pump and motor are connected in closed hydraulic circuit enabling the pump to supply fluid to the motor for driving the latter in opposite directions, reversible fluid operable means for varying the displacement of the pump in opposite directions from zero displacement, means normally maintaining the displacement varying means in zero displacement position, means providing a source of control fluid under pressure, and valve means controlling the flow of fluid to and from the displacement varying means including a valve housing having a supply port communicating with said source, a pair of motor ports communicating respectively with opposite sides of said displacement varying means, and a pair of drain ports, together with a valve member normally positioned in a neutral center position blocking said supply port and communicating said motor ports respectively with said drain ports and movable in opposite directions and in each direction successively to a first "run" position to block said supply port, block one motor port and to place the other motor port in communication with one drain port thereby locking the pump swash plate in a predetermined displacement condition, and successive "acceleration" positions, placing the supply port in communication with said one motor port and placing said other motor port in communication with said one drain port to increase the pump displacement in a predetermined direction, means for yieldably retaining the valve member in neutral position, manually operable means connected to the valve for moving the latter between the positions described, and spring means for moving the valve member from an acceleration position to said first position when released after manual movement to an acceleration position.

6. In a hydrostatic transmission for propelling a vehicle of the hard working, slow moving type, in combination, a reversible fluid motor, a variable displacement fluid pump, conduits respectively connecting the pump outlet with the motor inlet and the motor outlet with the pump inlet so that the pump and motor are connected in closed hydraulic circuit enabling the pump to supply fluid to the motor for driving the latter in opposite directions, reversible fluid operable means for varying the displacement of the pump in opposite directions from zero displacement, means normally maintaining the displacement varying means in zero displacement position, means providing a source of control fluid under pressure, and valve mean controlling the flow of fluid to and from the displacement varying means including a valve housing having a supply port communicating with said source, a pair of motor ports communicating respectively with opposite sides of the displacement varying means, and a pair of drain ports, together with a valve member normally positioned in a neutral center position blocking said supply port and communicating said motor ports respectively with said drain ports and movable in opposite directions and in each direction successively to a first "run" position to block said supply port, block one motor port and to place the other motor port in communication with one drain port thereby locking the pump swash plate in a predetermined displacement condition, and successive "acceleration" positions placing the supply port in communication with said one motor port and placing said other motor port in communication with said one drain port to increase the pump displacement in a predetermined direction, means for yieldably retaining the valve member in neutral position, manually operable means connected to the valve for moving the latter between the positions described, and means for moving the valve member from said acceleration positions to said first positions when released after manual movement to an acceleration position comprising a coiled compression spring on the valve member, spring seats movable on the valve member receiving opposite ends of the spring and thereby urged apart, stops on the valve member limiting movement of the spring seats apart, and abutments in the valve housing respectively spaced from the stops on the valve member when the latter is in neutral position and engageable respectively by the stops on movement of the valve member in opposite directions from the "run" positions.

7. In a hydrostatic transmission for propelling a vehicle of the hard working slow moving type, in combination, an axial piston motor including a rotatable cylinder block with axially reciprocal pistons therein and a swash plate contacting outer ends of the pistons, a reversible variable displacement axial piston pump including a rotatable cylinder block with axially reciprocable pistons therein and a swash plate contacting outer ends of the pistons and pivotally mounted for variable inclination in opposite directions from a neutral center position providing zero piston displacement, conduits respectively connecting the pump outlet with the motor inlet and the motor outlet with the pump inlet so that the pump and motor are connected in closed hydraulic circuit enabling the pump to supply fluid to the motor for driving the latter in opposite directions, means for varying the inclination of the pump swash plate to thereby vary the pump displacement including a first piston and cylinder device having a spring biased piston urging the pump swash plate in one direction and a second piston and cylinder device having a spring biased piston urging the pump swash plate in the opposite direction, with the two pistons normally maintaining the swash plate in a zero displacement position, means providing a source of control fluid under pressure, and means controlling the flow of fluid to and from said piston and cylinder devices including valve means normally positioned in a neutral center position connecting both piston and cylinder devices to drain, manually operable means for moving the valve means in opposite directions from the neutral position to "accelerate" positions connecting one device to drain and the other to said source to increase pump displacement in a predetermined direction, and resilient means for moving the valve means from the accelerate positions to "run" positions respectively intermediate the accelerate positions and the neutral position wherein flow of fluid to and from at least one device is blocked thereby to lock the transmission at a predetermined speed.

References Cited by the Examiner
UNITED STATES PATENTS

| | | | |
|---|---|---|---|
| 2,247,141 | 6/1941 | Twyman | 137—596.1 X |
| 2,291,011 | 7/1942 | Vickers | 60—53 X |
| 2,946,144 | 7/1960 | Anderson | 137—625.69 X |
| 3,074,296 | 1/1963 | Ebert | 60—53 X |
| 3,077,901 | 2/1963 | Klessig | 137—596.13 |

M. CARY NELSON, *Primary Examiner.*